United States Patent
Schroeder et al.

(10) Patent No.: US 12,055,183 B2
(45) Date of Patent: Aug. 6, 2024

(54) CAGE

(71) Applicant: Schaeffler Technologies AG & Co. KG, Herzogenaurach (DE)

(72) Inventors: Rainer Schroeder, Egenhausen (DE); Andreas Bierlein, Haßfurt (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/250,682

(22) PCT Filed: Oct. 6, 2021

(86) PCT No.: PCT/DE2021/100805
§ 371 (c)(1),
(2) Date: Apr. 26, 2023

(87) PCT Pub. No.: WO2022/096054
PCT Pub. Date: May 12, 2022

(65) Prior Publication Data
US 2023/0417285 A1    Dec. 28, 2023

(30) Foreign Application Priority Data

Nov. 3, 2020 (DE) .......................... 102020128881.6

(51) Int. Cl.
*F16C 33/46* (2006.01)
*F16C 43/06* (2006.01)

(52) U.S. Cl.
CPC ........ *F16C 33/4694* (2013.01); *F16C 43/065* (2013.01)

(58) Field of Classification Search
CPC .................................................. F16C 33/4694
See application file for complete search history.

(56) References Cited

U.S. PATENT DOCUMENTS

2002/0081053 A1\*   6/2002   van der Knokke ... F16C 33/504
                                                                  384/577

FOREIGN PATENT DOCUMENTS

| EP | 3173645 | A1 | 5/2017 | |
| FR | 3053749 | A1 \* | 1/2018 | .......... F16C 33/4605 |
| FR | 3053749 | A1 | 1/2018 | |
| JP | 11101245 | A  \* | 4/1999 | ............. F16C 33/46 |

(Continued)

OTHER PUBLICATIONS

JP-11101245-A English translation (Year: 1999).\*

*Primary Examiner* — Jason L Vaughan
*Assistant Examiner* — Amanda Kreiling
(74) *Attorney, Agent, or Firm* — Price Heneveld LLP

(57) ABSTRACT

A cage of a roller bearing includes at least two cage segments, wherein each cage segment is formed from two side pieces, which are disposed at an axial distance from one another, and from a plurality of webs that are circumferentially distanced from each other and that connect the side pieces in the axial direction, wherein each cage segment forms an arc of a given arc length, the plurality of webs includes a center web, which maintains a distance of half the given arc length from the circumferential ends of the respective cage segment, and wherein the center web is penetrated by a bore the center axis of which approximately runs through the center of gravity of the cage segment, and which is configured to accommodate a radially outwardly directed moving device in a releasable manner.

12 Claims, 6 Drawing Sheets

(56) References Cited

FOREIGN PATENT DOCUMENTS

| | | |
|---|---|---|
| JP | 11101245 A | 4/1999 |
| JP | 2001012479 A | 1/2001 |
| JP | 2009014076 A | 1/2009 |
| JP | 2009014077 A | 1/2009 |
| JP | 2009092189 A | 4/2009 |
| JP | 2014059037 A | 4/2014 |

* cited by examiner

CAGE

CROSS-REFERENCE TO RELATED APPLICATIONS

This application is a U.S. national stage application under 35 U.S.C. § 371 that claims the benefit of priority under 35 U.S.C. § 365 of International Patent Application No. PCT/DE2021/100805, filed on Oct. 6, 2021, designating the United States of America, which in turn claims the benefit of priority under 35 U.S.C. §§ 119, 365 of German Patent Application No. 102020128881.6, filed Nov. 3, 2020, the contents of which are relied upon and incorporated herein by reference in their entirety.

FIELD OF THE DISCLOSURE

The disclosure deals with the formation of cage segments of a split roller bearing and with a method for the assembly of such cage elements to form a cage.

BACKGROUND OF THE DISCLOSURE

To deliver better performance, rolling bearings usually have one-piece bearing rings and cage rings. However, this closed ring shape of the bearing and cage rings requires an axial assembly, i.e., an assembly in which the roller bearings are pushed as a whole or in the form of individual components onto a shaft to be supported axially from the outside.

Although an axial assembly of roller bearings is the norm when systems are the initial equipment, an axial assembly to replace worn roller bearings is not possible, or is only possible with hardly justifiable effort. However, so as not to let the further operation of plants fail because of worn roller bearings, one is moved to provide what are termed split roller bearings.

If the roller bearings at a bearing point of a system are worn with respect to the original equipment, these roller bearings are removed. To do this, it is necessary to raise the shaft supported by the roller bearings. Inner ring segments are then placed around the shaft and bonded together to provide a new inner bearing ring.

An outer ring segment is then introduced into the radial distance between the inner bearing ring formed and the lower part of the bearing housing and placed on the lower part of the bearing housing. Finally, a cage segment is placed on the formed inner bearing ring and then turned into the radial distance between the formed inner bearing ring and the outer ring segment. The next cage segment is then placed on the inner bearing ring that has been formed and one then proceeds as is described above.

With split roller bearings, the cages of such roller bearings are only made up of two cage segments to minimize the assembly effort, and the next cage segment then also represents the last cage segment at the same time, so that after the second cage segment has been removed, the roller bearing need only be completed with an outer ring segment. To position the cage segments on the inner bearing ring that is formed, a crane and at least one cable are provided, the ends of which are hooked into the load hook of the crane to form a sling. If a cage segment is to be moved into its position above the inner bearing ring that is formed, the respective sling encompasses the cage segment transversely to the circumferential direction thereof. If the cage segment is set down on the inner bearing ring that has been formed in this state, spacers must be provided to prevent direct contact between the cage segment and the inner bearing ring.

This is because only these spacers and the radial distance they produce between the inner bearing ring and cage segment will ensure that the cables required for positioning the respective cage segments can be pulled out again after the positioning between the cage segment and inner bearing ring.

However, the provision of spacers and the later removal thereof makes the formation of split roller bearings complex.

The present disclosure is therefore based on the object of specifying cage segments and an assembly method for split roller bearings which makes the use of spacers superfluous.

SUMMARY OF THE DISCLOSURE

If each cage segment, which describes a circular arc of arc length B, is provided with a center web which maintains a distance of half an arc length B from the circumferential ends of the respective cage segment, and passed through by a bore, the center axis of which runs essentially through the center of gravity of the cage segment and which is designed to releasably accommodate a radially outwardly directed moving device, the respective cage segment can be placed directly on the inner bearing ring by a load hook of a crane acting on the moving device.

It is advantageous if the moving device has an eye, because when the respective cable is pulled through the eye, a secure connection is established between the cage segment and the cable.

If the moving device is a rod, the respective cage segment can be screwed in very easily between the inner bearing ring and the outer ring segment by applying force to the rod.

There is no need to change moving devices for raising and screwing in the cage segments if the rod is equipped with an eye.

Damage to cage segments need not be a concern if each cage segment has two end webs that close off this cage segment in the circumferential direction and the middle web segment and/or the end webs of each cage segment have a greater extent than the other webs of this cage segment, at least in the circumferential direction. If the end webs are larger, there is no need for a mechanical connection between the cage segments because these larger dimensions are suitable for elastically absorbing unconnected cage segments hitting one another during operation without the fear of rollers jamming in pockets. The greater extension of the center web ensures that deformations during raising do not occur.

The supply of lubricant to the roller bearing is improved if at least one of the side pieces has a radially inwardly directed lowering of the outer peripheral edge thereof relative to the center web.

The noise development of the roller bearing is reduced if the cage elements forming the cage are connected to one another at the end segments thereof.

According to an aspect of the present disclosure, a quick and easy assembly of split rolling bearings results when cage segments are provided, wherein moving devices are introduced into the respective bores of the respective cage segment in such a way that they face radially outwards in relation to the cage segment, if at least one cage segment is raised by means of a raising device acting on the moving device, placed on the inner bearing ring of the roller bearing and then turned into the radial distance between the outer bearing ring and the inner bearing ring by means of forces acting in the circumferential direction on the moving devices, and that the last cage segment completing the cage is deposited on the inner bearing ring only by a raising device acting on the moving device.

BRIEF DESCRIPTION OF THE FIGURES

In the Figures.

DETAILED DESCRIPTION

The present disclosure will now be explained in more detail with reference to the figures.

Figure 1:
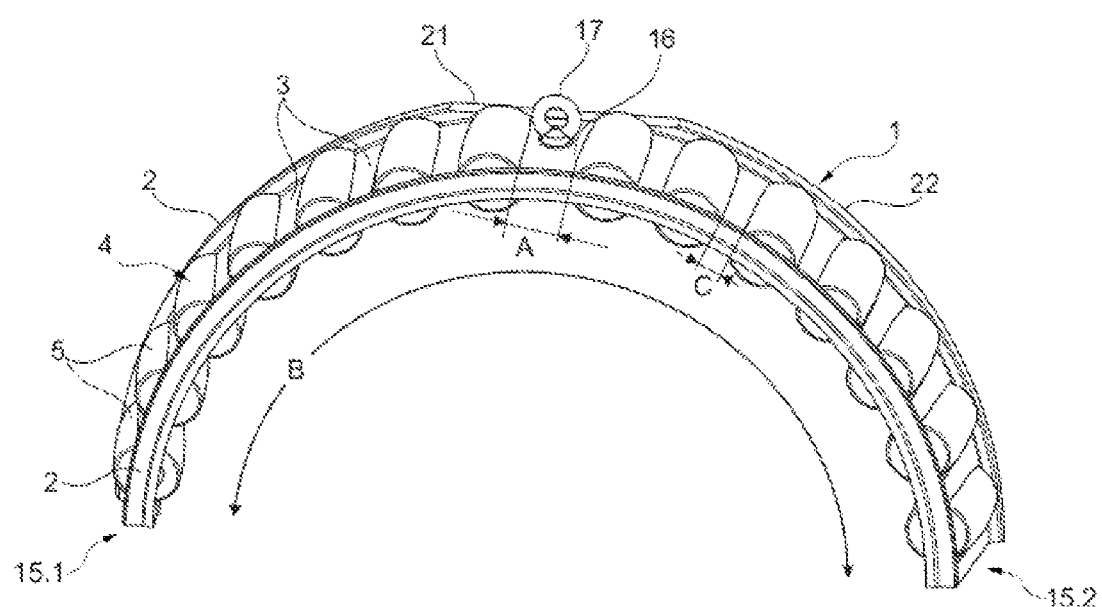
FIG. 1 shows a cage segment.

FIG. 1 shows a cage segment 1, which is disposed at an axial distance from two side pieces 2 and a plurality of webs 3, which maintain a mutual distance in the circumferential direction and connect the two side pieces 2. In this exemplary embodiment, this cage segment 1 is made in one piece from brass and, in another exemplary embodiment, can also be formed from sheet steel. The course of the side pieces 2 and the webs 3 provides pockets 4 into which rollers 5 have already been inserted.

Cage segments 1 of the type shown in FIG. 1 are used to form rolling bearings, where it is necessary to replace originally mounted rolling bearings with new rolling bearings after the wear limit has been reached without needing to carry out a complex, often unfeasible, axial assembly of rolling bearings. If an axial assembly of roller bearings is not possible, split bearing rings are provided both for the inner bearing ring and for the outer bearing ring, which again form closed bearing rings after the connection thereof. In the case of split bearings, the respective bearing rings are usually formed by two half shell-shaped bearing ring segments.

In FIG. 2, which shows the assembly process for a split roller bearing in four detailed representations (FIGS. 2a through d), after the removal of the old roller bearing (not shown), an inner bearing ring 6 is first attached to the shaft 7, which has been raised for this purpose in the direction of the arrow, in which two inner ring segments 8.1, 8.2 forming the inner bearing ring 6 are placed around the shaft 7 and are connected to each other. As FIG. 2a further shows, an outer ring segment 9.1 is then disposed on a lower part 10 of a two-part bearing housing 11 by pushing the outer ring segment 9.1 through the gap 12.1 between the inner bearing ring 6 and the lower part 10 is screwed into the final position thereof on the lower part 10 visible in FIG. 2b.

Figure 2A:
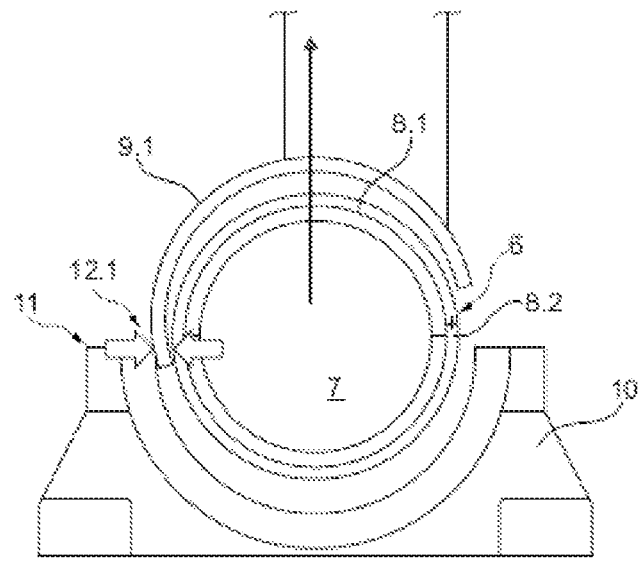
FIG. 2a-d shows an assembly process in four steps.
Figure 2B:
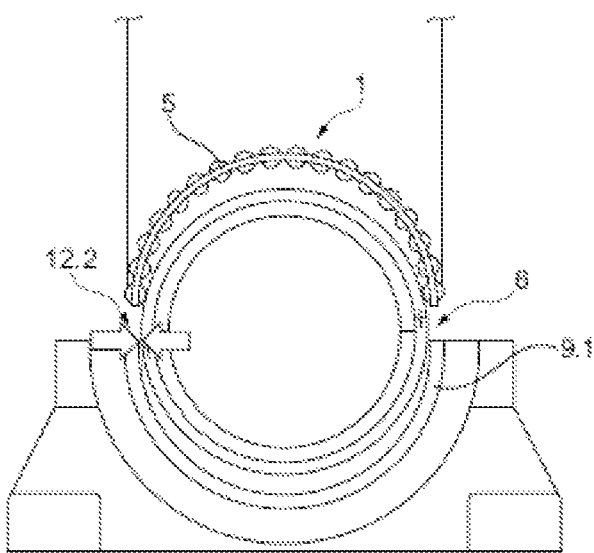
Figure 2C:
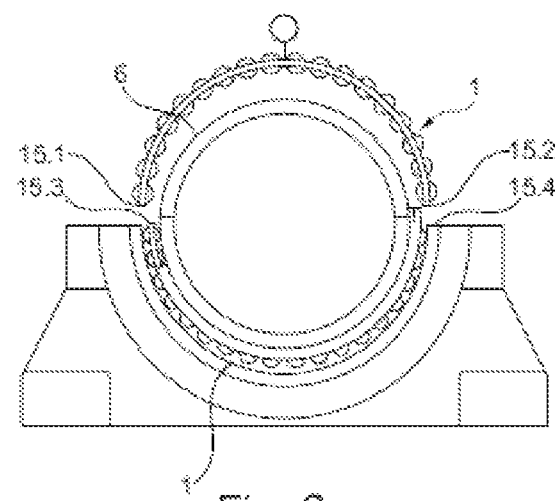
Figure 2D:
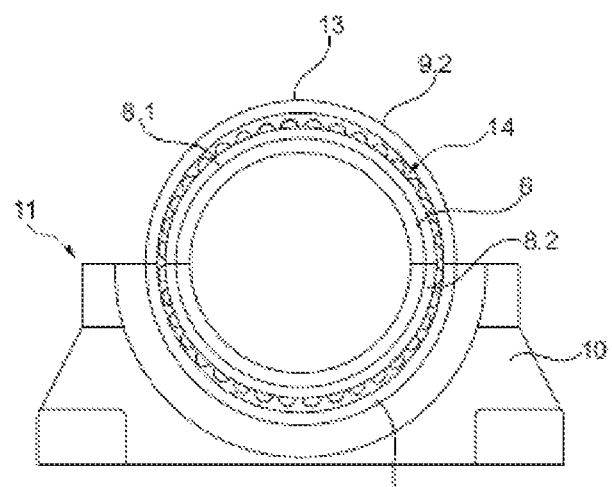

As already indicated in connection with FIG. 2a, a cage segment 1 already equipped with rollers 5 and described in FIG. 1 is then brought into its position shown in FIG. 2c by screwing into gap 12.2 between inner bearing ring 6 and outer ring segment 9.1. Since in the embodiment according to FIGS. 2a-d, the inner bearing ring 6, the outer bearing ring 13 and the cage 14 are formed in two parts, the closing of the roller bearing can then be started immediately after the training stage according to FIG. 2c has been reached. For this purpose, similar to the representation according to FIG. 2b, only one further cage segment 1 completing the cage 14 is deposited on the inner bearing ring 6. The latter is shown in FIG. 2c by a cage segment 1 still floating above the inner bearing ring 6. Depending on the design, the two cage segments 1 can be connected to one another at the circumferential ends 15.1, 15.2, 15.3, 15.4 thereof or remain unconnected.

Finally, to complete the outer bearing ring 13, the outer ring segment 9.2 is placed on the formed cage 14 and connected to the outer ring segment 9.1 already disposed in the lower part of the bearing housing 11.

If the assembly sequence shown in FIGS. 2a-d has a split cylindrical roller bearing as the object thereof, split spherical roller bearings can also be formed with this assembly sequence.

To handle the respective cage segments 1, which can have a considerable size and weight depending on the application, to complete a cage 14 easily and reliably, the cage segment 1 having an arc length B as per FIG. 1 has a center web 16, the axially running center line of which essentially maintains a circumferential distance of half an arc length B to the circumferential ends 15.1, 15.2 of the cage segment, and the size of which is increased compared to the size of the other webs 3. In the exemplary embodiment shown in FIG. 1, the enlargement of the center web 16 is evident from the fact that the extension A in the circumferential direction of the center web 16 of the cage segment 1 is greater than the extension C of the remaining webs 3 of this cage segment 1.

To move the respective cage segment 1 for the positioning thereof, an eye 17 is provided on the center web 16. This eye 17, which is detachably connected to the center web 16, is provided with a threaded pin 18, which for this purpose engages in a bore 19 introduced into the center web 16, the bore center Z of which as shown in FIG. 3 runs essentially through the center of gravity S of this cage segment 1 to prevent tilting of the cage segment 1 during positioning when the respective cage segment 1 is suspended from a cable 24 of a crane (not shown) guided through the eye 17 for the movement and assembly thereof.

For the sake of completeness, it should be pointed out that upgrading the center web 16 is not limited to increasing the extension A thereof in the circumferential direction of the cage segment 1. With regard to the non-loads that the center web 16 must endure when the cage segment 1—as shown in FIG. 2c—floats attached only to the eye 17 over the installation location thereof, the center web 16 compared to the other webs 3 can also have an enlarged thickness in the radial direction.

Figure 3:
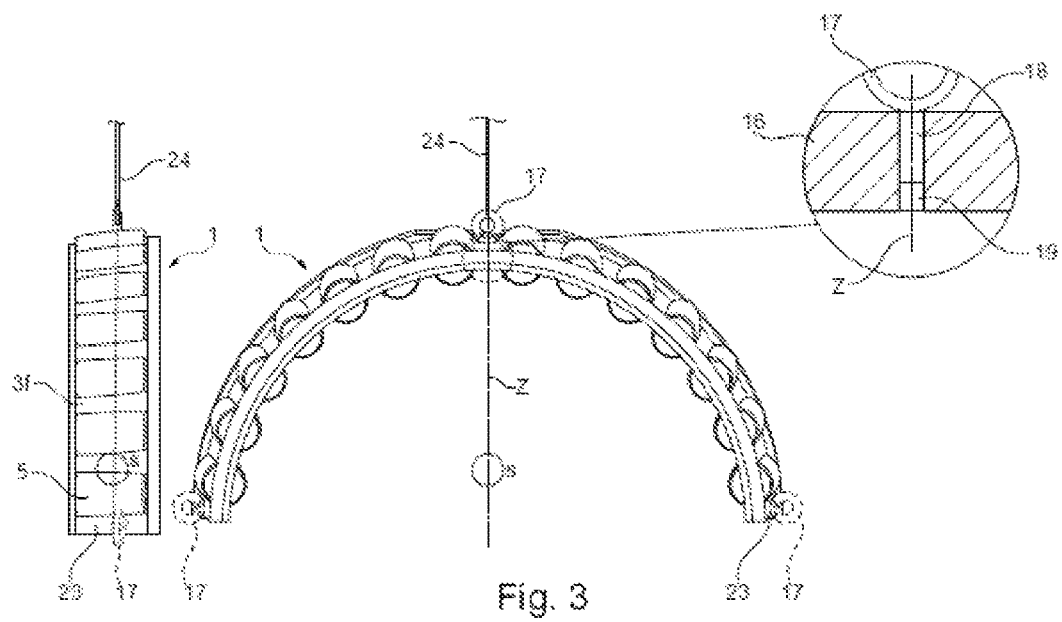
FIG. 3 shows a further view of a cage segment.
Figure 4:
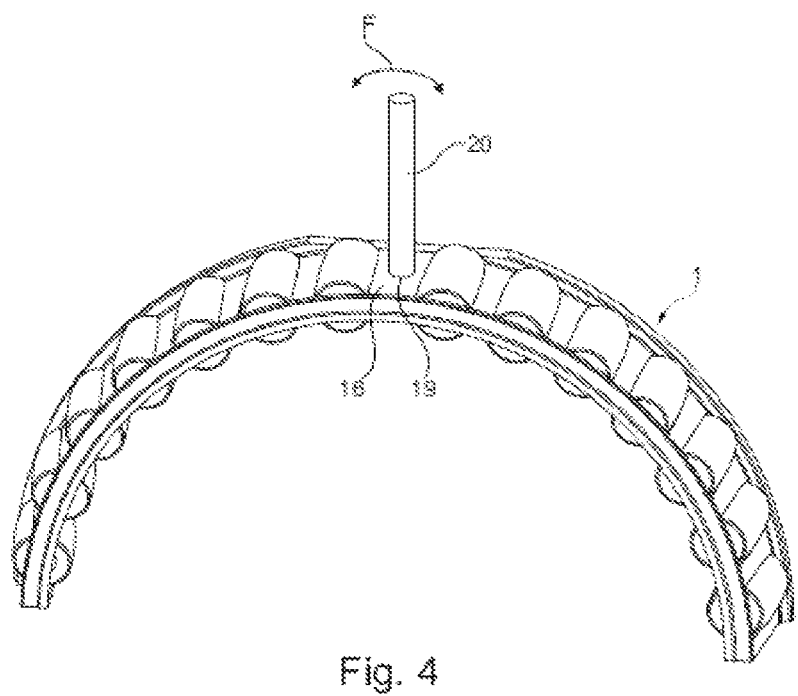
FIG. 4 shows a further embodiment according to FIG. 1.

The representation of a cage segment 1 according to FIG. 4 differs from the representation according to FIG. 3. solely by the fact that instead of the eye 17 now a rod 20 is inserted into the bore 19. Namely, when placing the cage segment 1 on the inner bearing ring 6 according to FIG. 2b, the eye 17 acting solely as a movement device in the form of a mere lifting device is exchanged for a rod 20, the cage segment 1 can be positioned very easily between inner bearing ring 6 and outer ring segment 9.1 by forces F affecting the rod 20.

Figure 5:
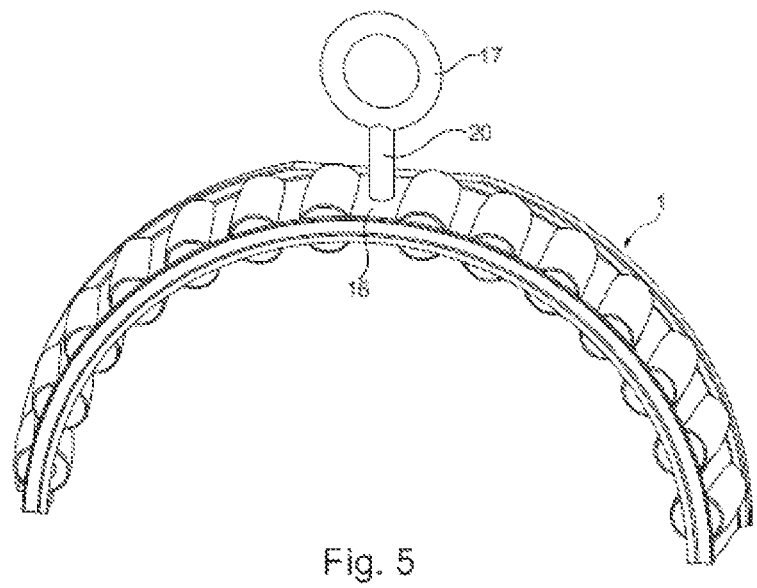
FIG. 5 shows a further embodiment according to FIG. 1.

FIG. 5 shows a moving device which combines the function of eye 17 and rod 20, and makes a changing of eye 17 and rod 20 superfluous. For this purpose, an eye 17 is attached to the end of the rod 20 that is not connected to the center web 16.

To improve lubrication, in view of FIG. 1, the axial rear side piece 2 in the region of the center web 16 is provided with a radially inwardly directed lowering 21 of its outer peripheral edge 22.

It can also be seen from FIG. 3 that the end webs 23 located at 3 o'clock and 9 o'clock can be enlarged in the circumferential direction compared to the webs 3 adjoining them in the direction of the center web 16. This enlargement of the end webs 23 can serve to connect cage segments 1 to one another—with connecting means not shown—or absorb mutual impacts in the case of unconnected cage segments and prevent rollers 5 immediately adjacent to the end webs 23 from jamming. The end webs 23 can also be used to accommodate optional eyes 17, which are therefore only shown as dashed lines, to screw cage segments 1 into the gap 12.2, as shown in FIG. 2a.

LIST OF REFERENCE NUMERALS

1 Cage segment
2 Side piece
3 Web
4 Pocket
5 Roller
6 Inner bearing ring
7 Shaft
8.1, 8.2 Inner ring segment
9.1, 9.2 Outer ring segment
10 Lower part
11 Bearing housing
12.1, 12.2 Gap
13 Outer bearing ring
14 Cage
15.2, 15.3, 15.4 Circumferential ends
16 Center web
17 Eye
18 Threaded pin
19 Bore
20 Rod
21 Lowering
22 Peripheral edge
23 End web
24 Cable
A Extension of center web
B Arc length
C Extension of other webs
F Forces
S Center of gravity
Z Bore center

The invention claimed is:

1. A cage of a roller bearing, comprising:
at least two cage segments, wherein each cage segment is formed from two side pieces, which are disposed at an axial distance from one another, and from a plurality of webs that are circumferentially distanced from each other and that connect the side pieces in the axial direction, wherein each cage segment forms an arc of a given arc length, the plurality of webs includes a center web, which maintains a distance of half the given arc length from circumferential ends of the respective cage segment, and wherein the center web is penetrated by a bore the center axis of which approximately runs through the center of gravity of the cage segment, and which is configured to accommodate a radially outwardly directed moving device in a releasable manner.

2. The cage of claim 1, wherein the moving device includes an eye.

3. The cage of claim 1, wherein the moving device includes a rod.

4. The cage of claim 3, wherein the rod comprises an eye.

5. The cage of claim 1, wherein each cage segment has two end webs that complete the cage segment in the circumferential direction, and wherein at least one of the center web and two end webs of each cage segment has a greater extent, at least in the circumferential direction, than the other webs in the plurality of webs of each cage segment.

6. The cage of claim 5, wherein the cage segments of the cage are connected to one another at the end webs of the respective cage segments.

7. The cage of claim 1, wherein at least one of the side pieces has a radially inwardly directed lowering of an outer peripheral edge thereof relative to the center web.

8. The cage of claim 1, wherein said cage is configured for receiving at least one of a plurality of spherical rollers and a plurality of cylindrical rollers.

9. A mounting method for a split cage of a split rolling bearing that includes an inner bearing ring and an outer bearing ring, wherein the split cage includes a plurality of cage segments, wherein each of the plurality of cage segments is formed from two side pieces, which are disposed at an axial distance from one another, and from a plurality of webs that are circumferentially distanced from each other and that connect the side pieces in the axial direction, wherein each cage segment forms an arc of a given arc length, the plurality of webs includes a center web, which maintains a distance of half the given arc length from circumferential ends of the respective cage segment, and wherein the center web is penetrated by a bore the center axis of which approximately runs through the center of gravity of the cage segment, and which is configured to accommodate a radially outwardly directed moving device in a releasable manner, comprising the steps of:
raising at least one of the plurality of cage segments via at least one raising device acting on the moving device of the at least one cage segment;
placing the at least one cage segment on the inner bearing ring; and
applying a force on the moving device of the at least one cage segment in the circumferential direction to move the at least one cage segment radially between the outer bearing ring and the inner bearing ring.

10. A cage segment of a cage of a roller bearing, comprising:
a first side piece;
a second side piece in an axially-spaced relationship with the first side piece; and
a plurality of webs that are circumferentially distanced from each other and that connect the first and second side pieces in the axial direction, the plurality of webs including a central web which is penetrated by a bore that is configured to releasably accommodate a radially outwardly directed moving device, and the plurality of webs further including first and second end webs disposed at opposite circumferential ends of the cage segment, wherein the first and second end webs extend circumferentially to a greater extent than at least one of the plurality of webs.

11. The cage segment of claim 10, wherein the central web extends circumferentially to a greater extent than at least one of the plurality of webs.

12. The cage segment of claim 10, wherein a center axis of the bore that penetrates the central web approximately runs through the center of gravity of the cage segment.

* * * * *